(12) United States Patent
Nichols et al.

(10) Patent No.: US 7,822,874 B2
(45) Date of Patent: Oct. 26, 2010

(54) PROVIDING THIRD PARTY CONTENT TO MEDIA DEVICES

(75) Inventors: Timothy Nichols, Los Altos, CA (US); Mark Andrew Ross, San Carlos, CA (US); Timothy Bucher, Los Altos, CA (US)

(73) Assignee: Dell Products L.P., Round Rock, TX (US)

( * ) Notice: Subject to any disclaimer, the term of this patent is extended or adjusted under 35 U.S.C. 154(b) by 12 days.

(21) Appl. No.: 11/697,631

(22) Filed: Apr. 6, 2007

(65) Prior Publication Data

US 2008/0049782 A1   Feb. 28, 2008

Related U.S. Application Data

(60) Provisional application No. 60/790,245, filed on Apr. 7, 2006.

(51) Int. Cl.
  *G06F 15/16* (2006.01)
(52) U.S. Cl. .................. 709/246; 709/217; 709/231
(58) Field of Classification Search .......... 709/246, 709/203, 217–232
See application file for complete search history.

(56) References Cited

U.S. PATENT DOCUMENTS

| | | | |
|---|---|---|---|
| 6,826,597 B1 * | 11/2004 | Lonnroth et al. | 709/207 |
| 6,871,236 B2 * | 3/2005 | Fishman et al. | 709/246 |
| 6,892,226 B1 * | 5/2005 | Tso et al. | 709/218 |
| 7,574,486 B1 * | 8/2009 | Cheng et al. | 709/219 |
| 2001/0030667 A1 * | 10/2001 | Kelts | 345/854 |
| 2002/0016801 A1 * | 2/2002 | Reiley et al. | 707/523 |
| 2002/0099735 A1 * | 7/2002 | Schroeder et al. | 707/513 |
| 2002/0161928 A1 * | 10/2002 | Ndili | 709/246 |
| 2003/0074271 A1 * | 4/2003 | Viswanath et al. | 705/26 |
| 2004/0019853 A1 * | 1/2004 | Takizawa et al. | 715/523 |
| 2004/0170155 A1 * | 9/2004 | Omar et al. | 370/349 |
| 2005/0128074 A1 * | 6/2005 | Culpepper et al. | 340/539.1 |
| 2006/0007466 A1 * | 1/2006 | Ben-Yehuda et al. | 358/1.13 |
| 2007/0061786 A1 * | 3/2007 | Zhou et al. | 717/136 |

OTHER PUBLICATIONS

XHTML™ 1.0 The Extensible HyperText Markup Language (Second Edition), Aug. 1, 2002.*
XHTML 1.0 The Extensible HyperText Markup Language (Second Edition), A Reformulation of HTML 4 in XML 1.0; Aug. 1, 2002.

* cited by examiner

*Primary Examiner*—Yasin Barqadle
(74) *Attorney, Agent, or Firm*—Workman Nydegger (57) ABSTRACT

A method and system for interfacing between a portable media device and one or more media content providers. The method may be practiced, for example, in a system including the portable media device that receives content from one or more media content providers. The method can include identifying a first data format employed by the portable media device and a second data format employed by a selected media content provider. A data stream is received from the selected media content provider. The data received from the selected media content provider can be modified to be compatible with the first data format. Alternately or additionally, the data stream can be filtered to eliminate content that is unnecessary for the portable media device. The method further includes communicating the formatted data to the portable media device.

21 Claims, 5 Drawing Sheets

PROVIDING THIRD PARTY CONTENT TO MEDIA DEVICES

CROSS-REFERENCE TO RELATED APPLICATIONS

This application claims the benefit of U.S. Provisional Patent Application Ser. No. 60/790,245 filed Apr. 7, 2006, which application is incorporated herein by reference in its entirety.

BACKGROUND

1. The Field of the Invention

The present invention relates generally to portable media devices. More specifically, embodiments of the present invention relate to methods and systems for interfacing portable media devices with media content providers.

2. The Relevant Technology

One of the advantages afforded by technological improvements is the ability to distribute to digital media. High quality digital media can be delivered over various types of networks in relatively short time frames. As a result, many different types of devices have been developed to enjoy the growing availability of digital media, including MP3 players, portable CD players, portable DVD players, notebook computers, cellular telephones, personal digital assistants (PDAs), are examples of such devices. Digital media can also be enjoyed on other non-portable devices as well such as on desk top computers.

Digital media can also be distributed to portable media devices via wireless communication, such as satellite radio, WiFi, cellular networks, and the like. A variety of media content providers are available for distributing music, video, Internet data, sports, news, weather, and the like, to portable media devices. Oftentimes, the data formats employed by the media content providers conflict with the data formats supported by the portable media devices. Therefore, certain portable media devices are unable to directly communicate with media content providers employing nonconforming data formats. For example, certain portable media devices may be able to communicate with a certain media content provider but not another, because of differences in operating parameters and other characteristics among the different media content providers, platforms, or other physical networks. Such differences may include incompatibilities arising from underlying technologies, communication frequencies, communication platforms, the underlying hardware and software that handle communication over a network, communication protocols which define the manner in which data are exchanged, or the physical or operational restrictions imposed by the media content providers to distinguish their services.

Consequently, users of portable media devices are often forced to partner with a limited number of media content providers which have compatible data formats. However, many users would prefer to have the ability to receive media content from a wider variety of media content providers.

Another problem that is often encountered is that the data provided by media content providers often include superfluous information that is not needed by the portable media device. For example, the data communicated by many media content providers are formatted for display on a standard sized computer monitor of a personal computer. However, most portable media devices have limited processing power, limited bandwidth, and small screen sizes, and are therefore unable to take full advantage of all the data provided by the media content providers. The superfluous information included in the data streams from most media content providers results in wasted bandwidth and wasted processor resources for the portable media devices receiving the data.

BRIEF SUMMARY OF THE INVENTION

These and other limitations are overcome by embodiments of the invention, which relate to systems and methods for providing content to computer devices including wireless portable devices. One embodiment is directed to a method of interfacing a device with one or more media content providers. The method may be practiced in a system including a device that receives content from one or more media content providers. The method includes identifying a first data format employed by the device and a second data format employed by a selected media content provider. Data are received from the selected media content provider in the second data format. The data received from the selected media content provider are modified in order to be compatible with the first data format. The modified data are then communicated to the device.

Another embodiment described herein is directed to a method of interfacing between a device and one or more media content providers. The method may be practiced, for example, in a system including a device that communicates with one or more media content providers. The method includes identifying one of the one or more media content providers with which the device will communicate, and receiving a first data stream from the identified media content provider. The first data stream is filtered in order to eliminate content that is unnecessary for the device. The filtered data stream is then communicated to the device. The first data stream may also be transformed so that it is compatible with the device.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention Embodiments of the present invention include a service for communicating data between a device and a media content provider. The service is typically implemented using one or more server computers that are accessible to both the device and the media content provider over a network such as the Internet. The connections to the server computers can include wired and/or wireless connections. The service is configured to allow a device and a media content provider to communicate with one another even where different data formats are employed by the device and media content provider. The service receives data from the media content provider in the data format used by the media content provider. If the data format used by the media content provider is determined to be incompatible with the data format used by the device, the service modifies the data received from the media content provider such that the data are compatible with the data format used by the device. The modified data are then communicated to the portable media device via a transmission medium.

In an alternative embodiment, a service is provided for interfacing a device with a media content provider where the data format employed by the media content provider includes superfluous information that is not needed or that cannot be used by the device. The service receives a data stream from a selected media content provider. If it is determined that the received data stream employs a data format that includes information that is not needed by the device, the service filters the data stream to eliminate the unnecessary data. The filtered data are then communicated to the portable media device. Also, the filtered data may also be transformed to an appropriate format.

Figure 1:
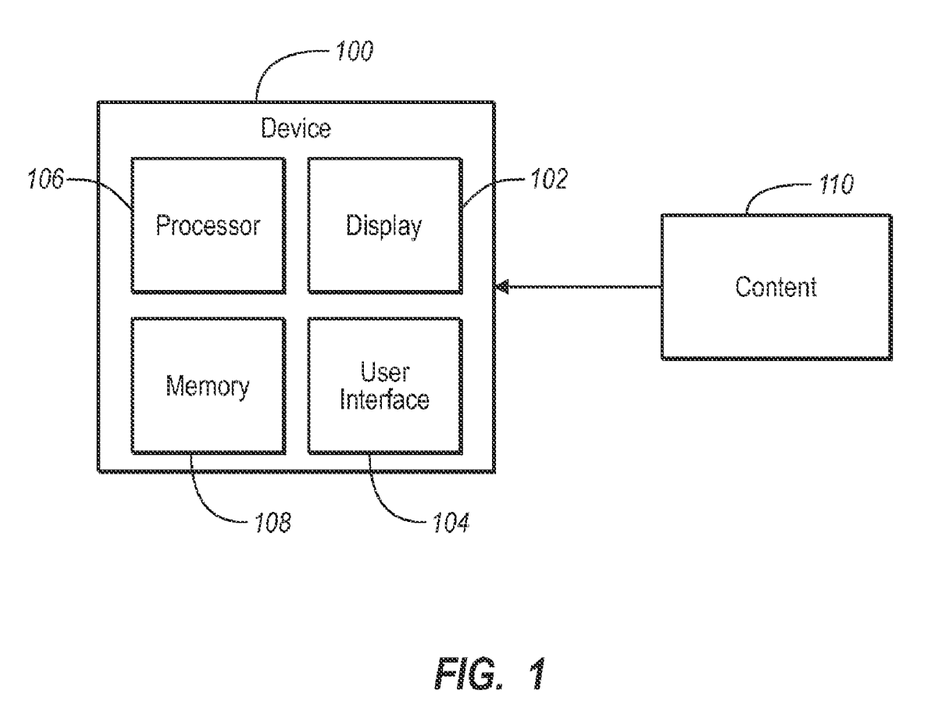
FIG. 1 illustrates a schematic drawing of a portable media device.

FIG. 1 illustrates an embodiment of a device that can receive content including digital media from one or more sources. Examples of the device 100 may include, by way of example, a satellite radio device, a portable audio player (MP3 player or iPod), a portable DVD or CD player, a personal computer, a laptop computer, a cellular telephone, a personal digital assistant (PDA), and the like or any combination thereof Embodiments of the invention generally refer to portable media devices, but one of skill in the art can appreciate that embodiments of the invention can be used with other devices able to receive and render media content.

Typically, the device 100 includes a display 102 that can convey information to the user of the device. For example, when the device 100 renders digital audio data, the display 102 may indicate the song title, the artist, the album title, the track number, the length of the track, and the like or any combination thereof The device 100 also includes a user interface 104 (such as control buttons, touch screen, capacitive input, etc.) or other means of providing input to the device 100. The user interface 104, by way of example, enables a user to navigate and activate the digital media and other content that is stored on the memory 108 of the device 100 or to navigate and perform any digital media or content that is received from an external source. The user interface 104 may enable a user to switch to another channel, such as in satellite radio, or otherwise select media content.

The content 110 represents different types of media including digital media that may be received by the device 100. Examples of the content 110 include, but are not limited to, digital music, talk audio data, television data, movie data, podcasts, sports data, weather data, news data, Internet data, and the like or any combination thereof The content 110 can be either digital or analog in nature.

Figure 2:
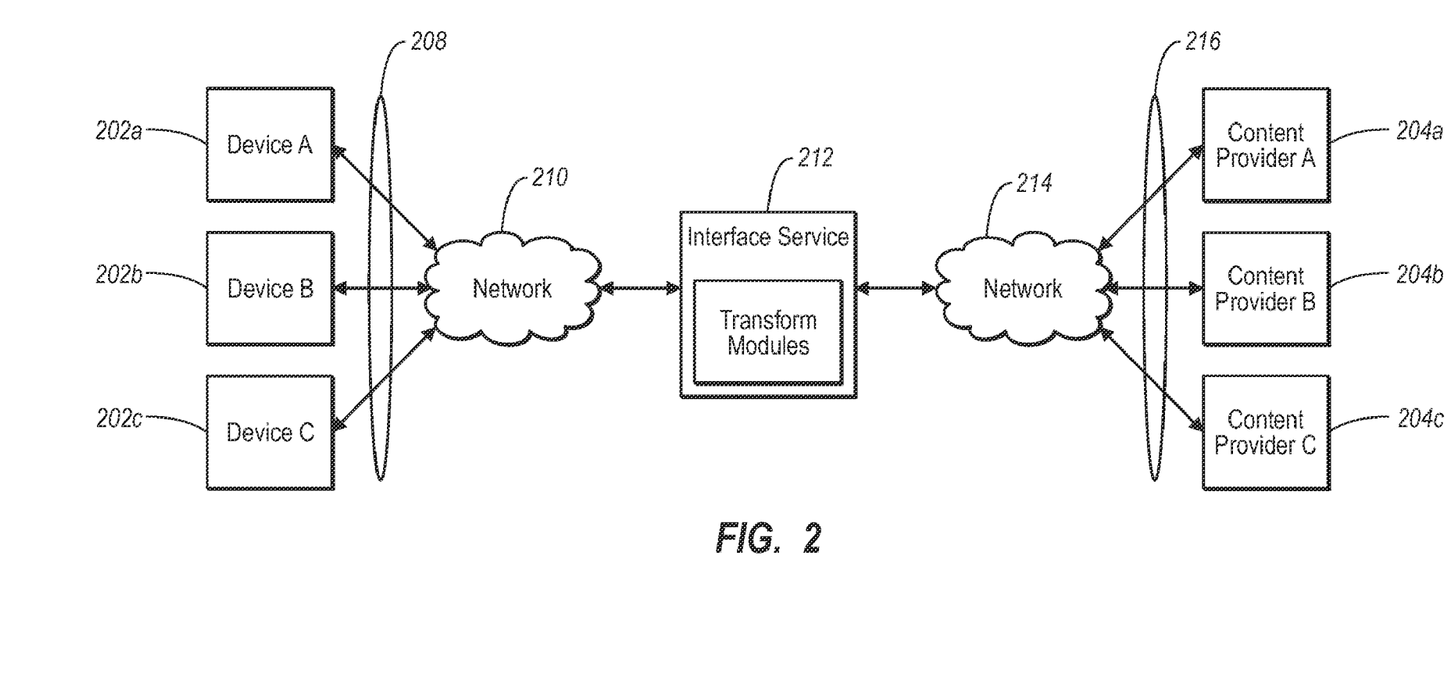
FIG. 2 illustrates a system including a service for interfacing between portable media devices and media content providers.

The memory 108 of the device can be used to store content or other user and/or device data. The memory 108, for example, may store digital music and/or video, graphics, play lists, user preferences, device settings, and the like or any combination thereof FIG. 2 illustrates one example of an environment for implementing embodiments of the invention. FIG. 2 includes a system 200 for enabling multiple devices 202a, 202b and 202c to communicate with multiple media content providers 204a, 204b and 204c. The system 200 includes a service 212, which is executing on server computer(s), for interfacing between the devices 202 and the media content providers 204. The service 212 may communicate with the devices 202 directly, or through a network 210, as illustrated in FIG. 2. Likewise, the service 212 may communicate with the media content providers 204 directly, or through a network 214, as illustrated in FIG. 2.

The devices 202 may include, for example, any of the devices described in reference to FIG. 1. The media content providers 204 are representative of media sources providing digital media that may be received by the devices 202. The media content providers 204 may be sources through which a user may obtain music, Internet data, video, podcasts, text data, and the like or any combination thereof Exemplary media content providers 204 may include, by way of example, satellite sources including digital radio and video, terrestrial sources, internet service providers, music downloads services, peer to peer networks, and the like or any combination thereof The media content providers 204 may include free services that may be accessed free of charge. Alternatively, the media content providers 204 may include pay services that may only be accessed by clients who are billed a predetermined amount, for example, a monthly charge, or a charge that is based on volume of usage. Furthermore, the media content providers 204 may either provide open access to the public, or may require user authentication.

The networks 210 and 214 represent any network that is compatible with the devices 202 or the media content providers 204 and may include, by way of example, satellite networks, 802.11 networks, personal computer networks (e.g., LAN, WAN), wireless networks (e.g., Bluetooth, WiFi), cellular networks, telephony networks (e.g., landline or PSTN), data networks, the Internet, and the like or any combination thereof The service 212 receives one or more data streams 208 from one or more of the devices 202, and likewise receives one or more data streams 216 from one or more of the media content providers 204. Exemplary data streams 208 and 216 include, by way of example, wired and wireless computer networks (LAN, WAN, Internet, WiFi, WiMax, EVDO, Edge Networks, GPRS, and the like), satellite signals, terrestrial signals, and the like.

Although illustrated as a single entity, the service 212 can be implemented in a distributed computing environment where tasks are performed by local and remote processing devices that are linked (either by hardwired links, wireless links, or by a combination of hardwired and wireless links) through a communications network. Additionally, the service may store information to enable content providers to communicate directly with devices in an acceptable format.

Each of the devices 202a, 202b and 202c may employ a different data format for displaying data to the user, interfacing with the user, storing data, processing data, communicating with a service, and the like or any combination thereof The digital media may also be stored in different formats. Audio data, for example, may be stored in formats that include, but are not limited to, mp3, acc, wav, wma, qt, ra, ram, and the like. Likewise, each of the media content providers 204a, 204b and 204c may employ their own data format for storing data, communicating with a portable media device, user authentication, billing, and the like. Because of the different data formats that may exist, direct communication between the portable media devices 202 and the media content providers 204 may be difficult. Difficulties can be related to the format of data that is rendered audibly as well as to the format of data that is rendered visually.

For example, certain portable media devices may be able to communicate with a certain media content provider but not another, because of differences in operating parameters and other characteristics among the different media content providers, platforms, or other physical networks. Such differences may include incompatibilities arising from underlying technologies, communication frequencies, communication platforms, the underlying hardware and software that handle communication over a network, communication protocols which define the manner in which data are exchanged, or the physical or operational restrictions imposed by the media content providers to distinguish their services.

The service 212 enables portable media devices 202 and media content providers 204 having otherwise inconsistent data formats to communicate with one another. The service 212 establishes communication with one or more devices 202 through a network 210, and also establishes communication with one or more media content providers 204 through a network 214. Although a preexisting relationship may exist between a device 202 and the service 212, no preexisting relationship is necessary.

The service 212 determines the media content providers 204 with which each device 202 desires to communicate. For example, the service 212 may receive a request to communicate with a particular media content provider. When a device 202 does have a preexisting relationship with the service 212, the service 212 is able to maintain a record of the data format employed by the device 202 and the media content providers 204 with which the device 202 is configured to communicate. For instance, the service 212 may store such information, including the data format employed by the device 202, in a mapping table included in memory of the service 212. Alternately, the mapping table may be stored remotely or may be otherwise accessible to the service 212. When a device 202 does not have a preexisting relationship with the service 212, the service 212 may perform an initialization routine upon connection to the device 202 to determine the data format employed by the device 202 and the media content providers 204 with which the device 202 desires to communicate.

Similarly, the media content providers 204 that connect to the service 212 may or may not have a preexisting relationship with the service 212. When a media content provider 204 does have a preexisting relationship with the service 212, the service 212 is able to maintain a record of the data format employed by the media content provider 204. When a media content provider 204 does not have a preexisting relationship with the service 212, the service 212 may perform an initialization routine upon connection to the media content provider 204 to determine the data format employed by the media content provider 204.

The service 212 is configured to transmit data from the media content providers 204 to the devices 202 and from the devices 202 to the media content providers 204. When the service 212 receives data from a media content provider 204, the service 212 identifies a target device 202 to which the data are to be sent and further determines the data format employed by that device. The service 212 then transforms the data received from the media content provider 204 into the data format employed by the target portable media device 202. Then, the service 212 communicates the transformed data to the target device 202. The service 212 may access one or more transform modules 218 to convert data from one format to another format, filter data, and/or remove superfluous data.

Similarly, when the service 212 receives data from a portable media device 202, the service 212 determines a target media content provider 204 to which the data are to be sent and further determines the data format employed by that media content provider. The service 212 then transforms the data received from the device 202 into the data format employed by the target media content provider 204. Then, the service 212 communicates the transformed data to the target media content provider 204.

The transformation of data from the data format employed by the source to the data format employed by the target destination may be performed in various ways. In one embodiment, the transform modules 218 enable the service 212 to perform a direct conversion of the data from the data format of the source to the data format of the target destination. This technique of direct conversion may potentially require a large number of unique algorithms due to the different data format combinations that may exist between the devices 202 and the media content providers 204. Alternatively, the service 212 may transform the data formats in two separate steps. First, the service 212 transforms the data received from the source into a generic format. Second, the service 212 transforms the data from the generic format into the format employed by the target destination.

Advantageously, the service 212 allows the portable media devices 202 and media content providers 204 of different data formats to communicate with one another with little or no computational burden being passed to the devices 202 or media content providers 204. Instead, the service 212 performs all of the requisite processing of data to enable the devices 202 and the media content providers 204 to communicate with one another. Embodiments of the invention free the media content providers to continue developing their content without concern for supporting multiple formats of multiple devices. At the same time, devices are able to select content from a broader scope of media content providers without concern of data incompatibility.

Figure 3:
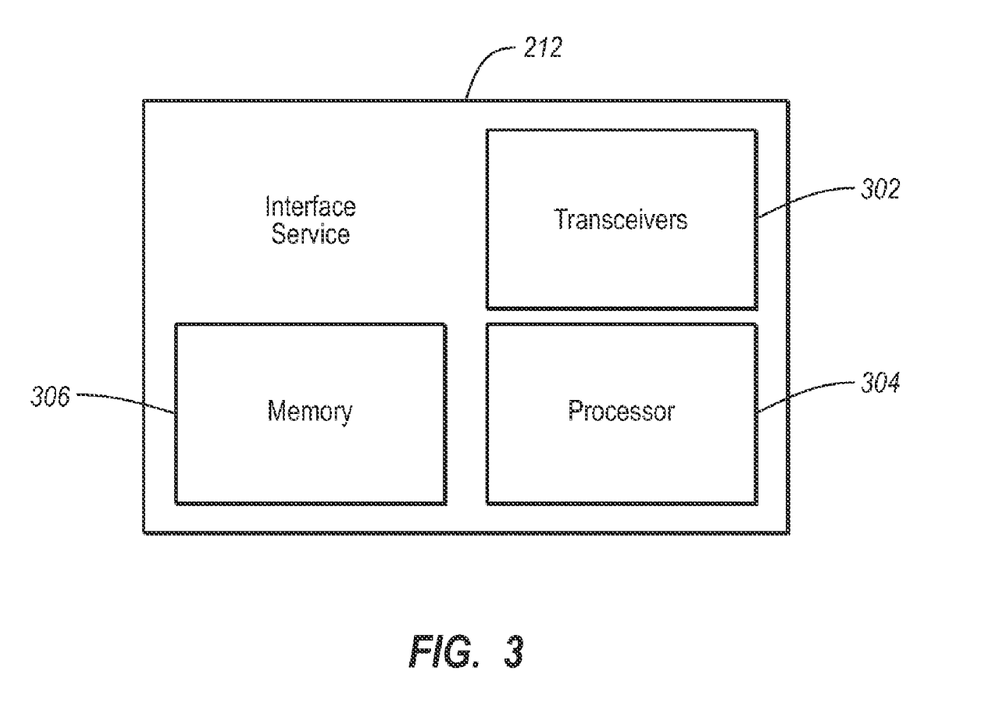
FIG. 3 illustrates a schematic drawing of a service for interfacing between portable media devices and media content providers.

Referring now to FIG. 3, a more detailed depiction is provided of the interface service 212. The interface service 212 includes one or more transceivers 302 for transferring data between itself and one or more portable media devices and also between itself and one or more media content providers. The transceivers 302 may include both wired and wireless transceivers for communicating with any of the networks 210 and 214, devices 202 and media content providers 204. The interface service 212 may further include one or more memory modules 306 for storing data received from the devices 202 and from the media content providers 204. For instance, the memory 306 may include one or more mapping tables including information about devices 202 and/or media content providers 204, such as the data formats employed by each. The interface service 212 may also include a processor 304. The processor 304 may be configured to format the data received from the devices 202 for the particular formatting needs of the media content providers 204, and for formatting the data received from the media content providers 204 for the particular formatting needs of the portable media devices 202.

Figure 4:
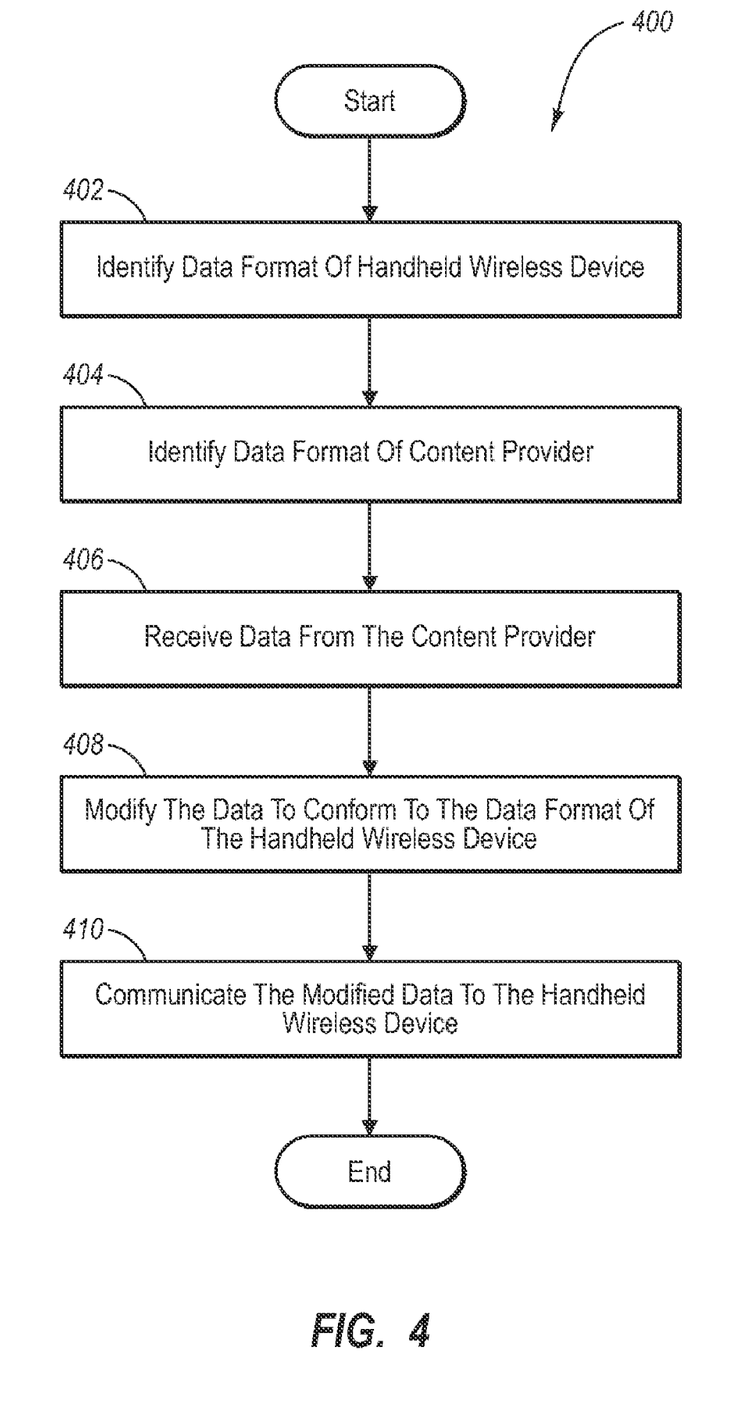
FIG. 4 illustrates a flow diagram for interfacing between a portable media device and one or more media content providers.

Referring now to FIG. 4, a method 400 of interfacing one or more portable media devices with one or more media content providers is illustrated. The method 400 may be practiced, for example, in a system including a portable media device that receives content from one or more media content providers. The method 400 includes identifying 402 a first data format employed by a portable media device, and identifying 404 a second data format employed by a selected media content provider. The identification of the first data format or of the second data format can be performed by the portable media device, the media content provider, and/or by the service 212. In this example, the interface service 212 may determine the first data format employed by the portable media device 202 and the second data format employed by the media content provider 204. As described previously, the first and second data formats may differ. In one embodiment, the service 212 identifies the first data format using a mapping table stored in memory or otherwise accessible to the service 212.

In one embodiment, identifying 404 a second data format employed by the selected media content provider may further include receiving from the portable media device an instruction identifying the selected media content provider. Once the media content provider has been identified, the method 400 may then proceed to identify the second data format employed by the selected media content provider. For example, and referring again to FIG. 2, the interface service 212 may receive from "Device B" 202b an instruction specifying that it desires to communicate with "Media Content Provider C" 204c.

The service then receives 406 data from the selected media content provider. For example, as illustrated in FIG. 2, the interface service 212 may receive data from one of or more of the media content providers 204. The data received from the selected media content provider may include many types of data, including Internet Protocol (IP) based data, video, music, podcasts, text data, Global Positioning System (GPS) data, and the like.

After receiving data from the media content provider in the second format, the service modifies 408 the data received from the selected media content provider to be compatible with the first data format. In one embodiment, modifying 408 the data received from the selected media content provider to be compatible with the first data format may further include filtering out the data that are not needed by the portable media device. For example, if the interface service 212 of FIG. 2 were to receive an HTML data stream from the selected media content provider 204, the interface service 212 may be configured to filter the HTML data stream to eliminate data that are not needed by the portable media device. One example of data that are not needed by many portable media devices includes user interface layout information, such as window size, background color, font style and size, page look and feel, and the like. Other superfluous data that may not be needed by the portable media device and may be filtered by the service 212 may include advertisements, images, pop up screens, video or audio data, and the like. The filtering performed by the service 212 may differ for each of the devices 212, depending on the specific data formats employed by each device. Filtering the data can improve usage of the bandwidth between the service and the portable devices as well as improve transmission times.

In another embodiment, modifying 408 the data received from the selected media content provider to be compatible with the first data format may further include converting the HTML data stream into an XML data stream. Alternately, modifying the data received from the selected media content provider may include converting an XML data stream to an HTML data stream. One skilled in the art will appreciate that the examples given are illustrative only, and any one of many different formats can be converted to a different one of the many different formats according to the invention. While the HTML and XML data formats have been discussed, embodiments of the invention can also be implemented with other well-known data formats as well as with proprietary data formats.

In one embodiment, modifying 408 the data received from the selected media content provider to be compatible with the first data format may further include converting the data received from the selected media content provider into a generic data format, and then converting the generic data format into the first data format, as employed by the portable media device. The service then communicates 410 the formatted data to the portable media device. Advantageously, this two-step process can reduce the computational complexity required to make the content received from the content provider compatible with the first data format.

The method 400 may further include steps for communicating data from one or more portable media devices to selected media content providers. For example, the method 400 may include receiving data from the portable media device, and modifying the data from the portable media device to be compatible with the second data format, as employed by the selected media content providers. The formatted data may then be transmitted to the selected media content provider.

In another embodiment, the method 400 may further include identifying data formats of a plurality of unique portable media devices and unique media content providers. Modification algorithms may be predefined for each identified data format so that the step of modifying 408 the data received from the selected media content provider to be compatible with the first data format may be performed by applying the appropriate predefined modification algorithm to the received data.

Figure 5:
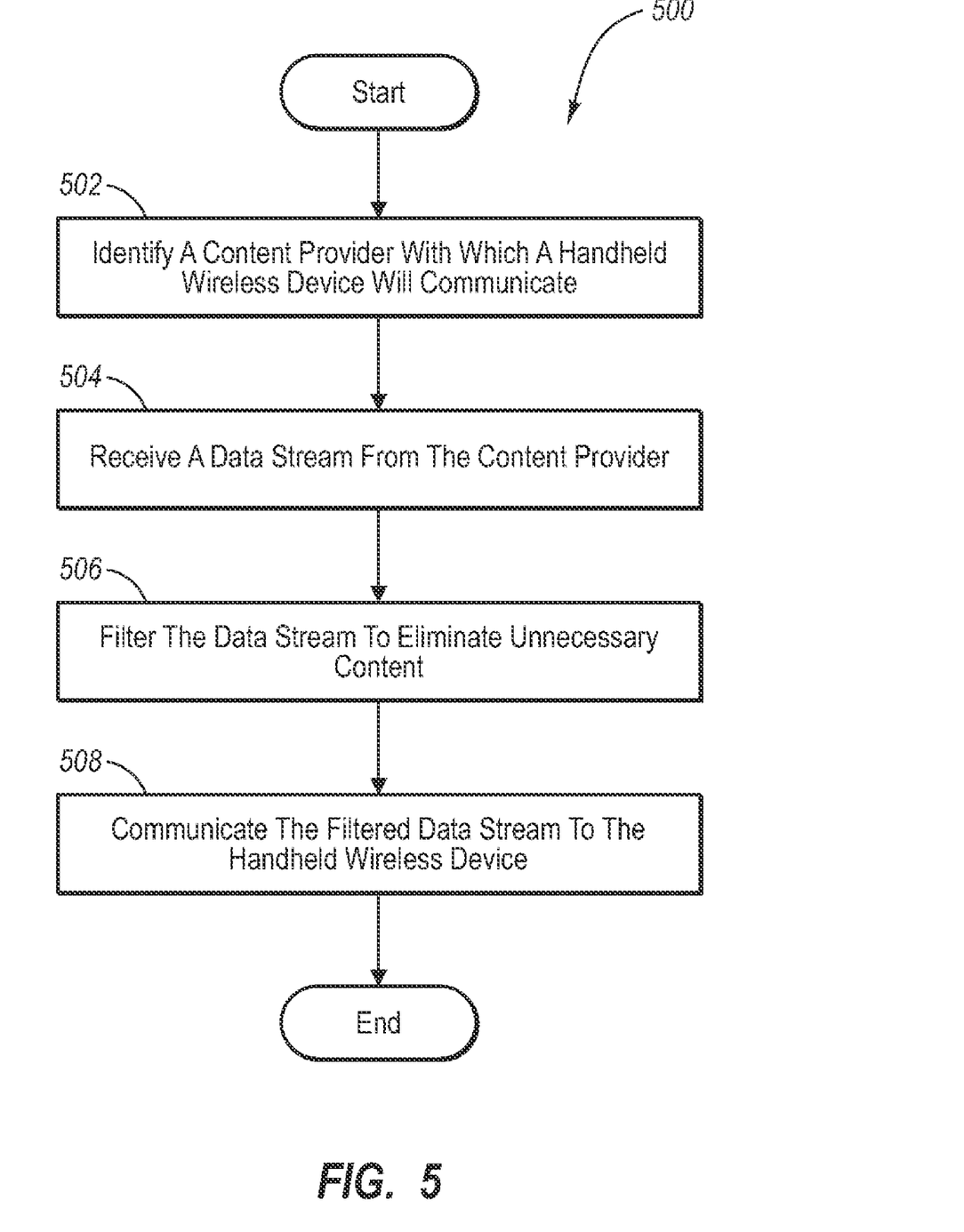
FIG. 5 illustrates another flow diagram for interfacing between a portable media device and one or more media content providers.

Referring now to FIG. 5, a method 500 is illustrated of interfacing between a portable media device and one or more media content providers. The method 500 includes identifying 502 one of the one or more media content providers with which the portable media device will communicate. Referring again to FIG. 2, the interface service 212 may identify media content provider 204b with which a device, for example 202a, will communicate. In one embodiment, identifying 502 one of the media content providers is accomplished by receiving a selection from the portable media device 202.

The method 500 further includes receiving 504 a first data stream from the identified media content provider. Thus, in FIG. 2, the interface service 212 receives the first data stream from the identified media content provider 204b. The first data stream may include a variety of data types, as described above, including IP-based data.

The method 500 may also include filtering 506 the first data stream to eliminate content that is unnecessary for the portable media device. As described above, content that may be unnecessary for the portable media devices may include user interface layout information, such as window size, background color, font style and size, page look and feel, and the like. Furthermore, where the first data stream includes conventional HTML, the filtering 506 of the first data stream may include converting the first data stream into a simplified version of HTML that is customized for the portable media device. Because a unique data format may be employed by each media content provider and by each portable media device, the process by which the first data stream is filtered may be customizable for each of the media content providers and for each of the portable media devices.

The method 500 may further include, at 508, communicating the filtered data stream to the portable media device. In one embodiment, the filtered data may be altered to include content that is appropriate for the destination device and that was previously filtered out.

In addition to communicating data from the media content provider to the portable media device, the method 500 may communicate data from the portable media device to the media content provider. For example, the method 500 may further include receiving a second data stream from the portable media device. The second data stream may be formatted to create a third data stream that is customized for the selected media content provider. The formatting of the second data stream may be customizable for each of the media content providers. The resultant third data stream may then be communicated to the selected media content provider.

In addition to filtering out data that are not needed by the portable media device the method 500 may further include additional steps for customizing the data received from the media content provider for communication to the portable media device. For example, the method 500 may further include identifying a first data format employed by the portable media device, and identifying a second data format employed by the one or more media content providers. If the first and second data formats are incompatible with one another, the method 500 may further include modifying the data received from the one or more media content providers so that the modified data are compatible with the first data format. Likewise, the method 500 may further include additional steps for customizing the data received from the portable media device for communication to the media content provider. Therefore, in the event that the first and second data formats are incompatible with one another, the method 500 may further include modifying the second data stream received from the portable media device so that the modified data are compatible with the second data format.

The services described herein provide an interface that allows users of portable media devices and other portable media devices to access content from various media content providers of differing formats without being required to reconfigure the device for each differing format. Instead, the present invention provides a hassle free uniform interface for communicating with a large number of media content providers. The acts and methods described herein may be implemented in hardware, software, or any combination of hardware and software.

Embodiments herein may comprise a special purpose or general-purpose computer including various computer hardware. Portable media devices are examples of special purpose computers. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system including a portable media device able to receive content from a plurality of media content providers, a method for interfacing between the portable media device and the plurality of media content providers, the method comprising:

receiving, at an interface service server, a request from the portable media device to communicate with a first media content provider selected from a plurality of media content providers, wherein the interface service communicates with the plurality of media content providers and the portable media device, the first media content provider comprising a satellite radio provider;

identifying a first data format employed by the portable media device, the first data format employing a first frequency for communicating data from the interface service server to the portable media device;

identifying a second data format employed by the selected media content provider, wherein the second data format is a satellite radio format that employs a second frequency different from the first frequency employed by the first data format;

receiving data from the selected media content provider, the data conforming to the second data format including being received over the second frequency;

transforming the data received from the selected media content provider from the second data format into a generic data format, wherein the generic data format is of a type of format that is different from the second data format employed by the selected media content provider;

transforming the generic data format into the first data format employed by the portable media device including encoding the generic data format at the first frequency, wherein the first data format is of a type of format that is different from the generic format; and communicating, over the first frequency, the data that has been transformed from the generic data format to the first data format to the portable media device such that the portable media device, that would otherwise be incapable of receiving data from the satellite radio provider, receives the data from the satellite radio provider.

2. The method as recited in claim 1, further comprising:
receiving second data from the portable media device, the second data conforming to the first data format;
modifying the second data from the portable media device to be compatible with the second data format; and
transmitting the modified second data to the selected media content provider.

3. The method as recited in claim 1, further comprising:
receiving, at the interface service server, a subsequent request from the portable media device to switch to communicate with a second media content provider selected from the plurality of media content providers, the second media content provider comprising an internet based radio provider;
identifying a third data format employed by the second media content provider, wherein the third data format is an IP format;
receiving data from the second media content provider, the data conforming to the third data format;
transforming the data received from the second media content provider from the third data format into the generic data format, wherein the generic data format is of a type of format that is different from the third data format employed by the second media content provider;
transforming the generic data format into the first data format employed by the portable media device; and
communicating the data that has been transformed from the generic data format to the first data format to the portable media device.

4. The method as recited in claim 1, wherein modifying the data received from the selected media content provider further comprises filtering out particular data that are not needed by the portable media device.

5. The method as recited in claim 4, wherein filtering out particular data that are not needed by the portable media device further comprises eliminating user interface layout information that is not needed by the portable media device.

6. The method as recited in claim 1, wherein communicating the data over the first frequency comprises: communicating the data via a wireless network, wherein the wireless network is one or more of an 802.11 network, a terrestrial network, or a cellular network.

7. The method as recited in claim 1, wherein identifying a second data format employed by the selected media content provider further comprises:
receiving from the portable media device an instruction identifying the selected media content provider; and
identifying the second data format employed by the selected media content provider.

8. The method as recited in claim 1, wherein receiving data from the selected media content provider includes receiving data from a global positioning system.

9. The method as recited in claim 1, further comprising:
identifying data formats of a plurality of unique portable media devices and unique media content providers; and
defining a modification algorithm for each identified data format.

10. The method as recited in claim 1, wherein identification of the first data format employed by the portable media device is accomplished through the use of a mapping table accessible to an interface service.

11. In a service capable of communicating with one or more portable media devices and a plurality of media content providers, a method for interfacing between the one or more portable media devices and the plurality of media content providers, the method comprising:
receiving a request from the portable media device identifying a first media content provider from the plurality of media content providers, the first media content provider comprising a satellite radio provider;
receiving a first data stream that is of a first data format type from the first media content provider, wherein the first data format type is a satellite radio format type that employs a first frequency different from each frequency in a set of frequencies used by the portable media device for receiving data;
filtering the first data stream to eliminate content that is unnecessary for the portable media device;
altering the filtered first data stream that is of a first data format type to include content appropriate for the portable media device that was previously filtered out of the first data stream;
converting the first data stream that is of a first data format type into a generic data format, wherein the generic data format is of a type of format that is different from the first data format type employed by the first data stream;
converting the generic data format into a format compatible with the portable media device including encoding the generic data format at a second frequency selected from the set of frequencies used by the portable media device for receiving data, wherein the format that is compatible with the portable device is of a format type that is different from the generic format type;
communicating, at the second frequency, the filtered data stream that is of the format type compatible with the portable device to the portable media device;
receiving a subsequent request from the portable media device identifying a second media content provider from the plurality of media content providers;
receiving, from the second identified media content provider, a second data stream that is of a different format type than the first data stream;
converting the second data stream format to the generic data format;
converting the generic data format into the format that is compatible with the portable media device; and
communicating the second data stream that is of the format type compatible with the portable device to the portable media device.

12. The method as recited in claim 11, further comprising:
receiving a third data stream from the portable media device;
formatting the third data stream to create a fourth data stream that is customized for the first media content provider; and
communicating the fourth data stream to the first media content provider.

13. The method as recited in claim 12, wherein filtering the first data stream is customizable for each of the media content providers and wherein formatting the third data stream is customizable for each of the media content providers.

14. The method as recited in claim 12, further comprising:
identifying a first data format employed by the portable media device, wherein the third data stream conforms to the first data format;
identifying a second data format employed by the first identified media content provider; and
wherein formatting the third data stream to create a fourth data stream comprises modifying the third data stream such that the fourth data stream is compatible with the second data format.

15. The method as recited in claim 11, wherein filtering the first data stream to eliminate content that is unnecessary for the portable media device further comprises transforming a first format of the first data stream to a second format compatible with the portable media device.

16. The method as recited in claim 15, wherein:
the second data stream received from the second media content provider comprises an HTML data stream; and
filtering the second data stream includes filtering the HTML data stream to eliminate data that are not needed by the portable media device.

17. The method as recited in claim 16, wherein the format that is compatible with the portable media device comprises an XML format.

18. The method as recited in claim 15, wherein:
the second data stream received from the second media content provider comprises an XML data stream; and
filtering the second data stream includes filtering the XML data stream to eliminate data that are not needed by the portable media device.

19. The method as recited in claim 18, wherein the format that is compatible with the portable media device comprises a proprietary format.

20. The method as recited in claim 15, wherein filtering the first data stream includes eliminating user interface layout information that is not needed by the portable media device.

21. An interface service server for communicating data between one or more portable media devices and a plurality of media content providers, comprising:
a plurality of transceivers for transferring data between the service server and the one or more portable media devices and between the service server and the plurality of media content providers;
one or more memory modules for storing data received from the one or more portable media devices and the plurality of media content providers; and
a processor for executing computer executable instructions stored in the one or more memory modules to perform the following method:
receive, at an interface service server, a request from the portable media device to communicate with a first media content provider selected from a plurality of media content providers, wherein the interface service communicates with the plurality of media content providers and the portable media device, the first media content provider comprising a satellite radio provider;
identify a first data format employed by the portable media device, the first data format employing a first frequency for communicating data from the interface service server to the portable media device;
identify a second data format employed by the selected media content provider, wherein the second data format is a satellite radio format that employs a second frequency different from the first frequency employed by the first data format;
receive data from the selected media content provider, the data conforming to the second data format including being received over the second frequency;
transform the data received from the selected media content provider from the second data format into a generic data format, wherein the generic data format is of a type of format that is different from the second data format employed by the selected media content provider;
transform the generic data format into the first data format employed by the portable media device including encoding the generic data format at the first frequency, wherein the first data format is of a type of format that is different from the generic format; and
communicate, over the first frequency, the data that has been transformed from the generic data format to the first data format to the portable media device such that the portable media device, that would otherwise be incapable of receiving data from the satellite radio provider, receives the data from the satellite radio provider.

* * * * *